United States Patent
Loo et al.

(10) Patent No.: US 12,141,755 B2
(45) Date of Patent: Nov. 12, 2024

(54) DISPLAYING CONTENT IN A COLLABORATIVE WORK ENVIRONMENT

(71) Applicants: Atlassian Pty Ltd., Sydney (AU); Atlassian Inc., San Francisco, CA (US)

(72) Inventors: WaiYee Loo, Sydney (AU); Benjamin Edwin Morgan, Sydney (AU); Albert Kavelar, Sydney (AU); Bree Davies, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 17/177,886

(22) Filed: Feb. 17, 2021

(65) Prior Publication Data

US 2022/0261761 A1 Aug. 18, 2022

(51) Int. Cl.
| | |
|---|---|
| *G06Q 10/00* | (2023.01) |
| *G06F 3/0482* | (2013.01) |
| *G06F 9/445* | (2018.01) |
| *G06F 16/903* | (2019.01) |
| *G06Q 10/10* | (2023.01) |
| *H04L 9/40* | (2022.01) |

(52) U.S. Cl.
CPC ......... *G06Q 10/103* (2013.01); *G06F 3/0482* (2013.01); *G06F 9/445* (2013.01); *G06F 16/90335* (2019.01); *H04L 63/0815* (2013.01)

(58) Field of Classification Search
CPC .................. G06Q 10/103; G06Q 10/10; G06F 16/90335; G06F 3/0482; G06F 9/445; H04L 63/0815
See application file for complete search history.

(56) References Cited

U.S. PATENT DOCUMENTS

| | | | |
|---|---|---|---|
| 2005/0177730 A1* | 8/2005 | Davenport | G06F 21/41 713/182 |
| 2008/0010287 A1* | 1/2008 | Hinton | H04L 61/30 |

(Continued)

FOREIGN PATENT DOCUMENTS

| | | | | |
|---|---|---|---|---|
| EP | 3336785 A1 * | 6/2018 | ........... | G06F 3/1454 |
| WO | WO-0126281 A1 * | 4/2001 | ............. | G06F 21/31 |

OTHER PUBLICATIONS

Wikipedia, "Style Sheet Language", https://en.wikipedia.org/wiki/Style_sheet_language, accessed Apr. 20, 2021 (Year: 2021).*

(Continued)

*Primary Examiner* — Andrew Chase Lakhani
(74) *Attorney, Agent, or Firm* — Brownstein Hyatt Farber Schreck, LLP

(57) ABSTRACT

A collaborative work environment can include multiple collaboration tools. A first collaboration tool can be configured to receive a single sign-on token from a client application and, in response obtain first content from a database of the first collaboration tool. The first collaboration tool and/or a client application coupled to the collaboration tool is configured to extract an identifier referencing content stored in a second collaboration tool. In response the first collaboration tool and/or the client application submit a request with the SSO token to the second collaboration tool for second content. Thereafter, the first content is merged with the second content and displayed in a common user interface.

20 Claims, 6 Drawing Sheets

(56) References Cited

U.S. PATENT DOCUMENTS

| | | | | |
|---|---|---|---|---|
| 2008/0077983 A1* | 3/2008 | Meyer | ................ | H04L 63/0815 |
| | | | | 715/234 |
| 2012/0137360 A1* | 5/2012 | Henderson | ............ | H04L 63/102 |
| | | | | 726/17 |
| 2013/0067594 A1* | 3/2013 | Kantor | .................. | G06Q 50/01 |
| | | | | 726/28 |
| 2014/0068702 A1* | 3/2014 | Hyndman | ............ | H04L 63/0815 |
| | | | | 726/1 |
| 2014/0230011 A1* | 8/2014 | Drewry | .............. | H04L 63/0435 |
| | | | | 726/1 |
| 2014/0236649 A1* | 8/2014 | Hamid | ................ | G06Q 10/103 |
| | | | | 705/7.11 |
| 2015/0089620 A1* | 3/2015 | Manza | .................. | H04L 63/10 |
| | | | | 726/8 |
| 2015/0277708 A1* | 10/2015 | Rodrig | .................. | G06F 9/451 |
| | | | | 715/777 |
| 2016/0246769 A1* | 8/2016 | Screen | ................ | H04L 67/1097 |
| 2017/0317898 A1* | 11/2017 | Candito | .............. | G06Q 10/103 |
| 2017/0364866 A1* | 12/2017 | Steplyk | ................ | G06Q 10/101 |
| 2018/0176207 A1* | 6/2018 | Malatesha | ............... | G06F 9/542 |
| 2018/0276053 A1* | 9/2018 | Kesavan | ................ | H04L 67/20 |
| 2018/0374050 A1* | 12/2018 | Murari | ................ | G06Q 10/107 |
| 2019/0213243 A1* | 7/2019 | Silk | ......................... | G06F 16/27 |
| 2019/0222568 A1* | 7/2019 | Sridhar | .................... | H04L 9/30 |
| 2019/0303139 A1* | 10/2019 | Pechacek | .................. | G06F 8/36 |

OTHER PUBLICATIONS

Alves, Paulo and Uhomoibhi, James, "Identity Management and E-Learning Standards for Promoting the Sharing of Contents and Services in Higher Education", EUNIS 2008-14th International Conference of European University Information Systems (2008), accessed Aug. 6, 2021 (Year: 2008).*

Chakravarty et al "File-share App—a collaborative tool", IEEE Pune Section International Conference, Dec. 2021, accessed Mar. 21, 2024 (Year: 2019).*

* cited by examiner

DISPLAYING CONTENT IN A COLLABORATIVE WORK ENVIRONMENT

TECHNICAL FIELD

Embodiments described herein relate to collaborative work environments and, in particular, to automated systems and methods for displaying content stored by one collaboration tool of a collaborative work environment within a graphical user interface of a second collaboration tool of the collaborative work environment.

BACKGROUND

An organization can establish a collaborative work environment by self-hosting, or providing its employees with access to, one or more platforms or services to facilitate cooperation and completion of work related to common goals. In many cases, a collaborative work environment is defined by multiple purpose-configured collaboration tools (e.g., issue tracking systems, documentation systems, code repository systems, and so on), which may be leveraged by teams to share information.

However, in many circumstances, content stored in one collaboration tool may be related to and/or relevant to content stored in another collaboration tool, requiring users of those tools to regularly switch between different collaboration tools in order to understand current status of work related to a common goal.

SUMMARY

Embodiments described herein take the form of a client device for displaying content in a collaborative work environment. The client device includes at least a display, a working memory, and a processor. The processor can be configured to load into the working memory at least one executable asset to instantiate an instance of a client application associated with a documentation service of the collaborative work environment.

The client application can be configured to obtain a single sign-on token from a single sign-on service and to render a graphical user interface with the display. In addition, the client application can be configure to submit a first content request to a first host server executing the documentation service. The content request includes the single sign-on token.

The client application can also be configured to receive from the first host server a first content, the first content being responsive to the first content request and including at least a project identifier and a board identifier. After receiving the first content, the client application can submit a second content request to a second host server executing an issue tracking service. The second content request, like the first content request, includes the single sign-on token, the project identifier, and the board identifier. After sending the second content request, the client application is configured to receive from the second host server a second content responsive to the second content request. Finally, the client application can be configured to insert the second content in the first content, and thereafter to render the (modified) first content in the graphical user interface. In this manner, the documentation service client application can serve and display content stored by multiple different collaboration tools of the collaborative work environment. In particular, the documentation service client application is configured to display content from both the documentation service and the issue tracking service.

Further embodiments described herein take the form of a method of displaying secure content stored in an issue tracking system within secure content of a documentation system, the method including operations of: receiving, at the documentation system from an instance of a client application executing at a client device, a first secure content request identifying a secure document stored by the documentation system; querying with an authentication token, by the documentation system, a database to obtain the secure document; determining that the secure document includes a project identifier corresponding to a secure project tracked by the issue tracking system; submitting, by the documentation system to the issue tracking system, a second secure content request including at least the authentication token, and the project identifier; receiving, at the documentation system from the issue tracking system, a secure content; embedding the secure content into the secure document; and generating a response with the secure document to the instance of the client application.

Embodiments described herein also take the form of a method of displaying secure content stored in an issue tracking system within secure content of a documentation system, the method including operations of: receiving, at the documentation system, a first secure content request identifying a secure document stored by the documentation system; querying, by the documentation system, a database to obtain the secure document; submitting, by the documentation system to the issue tracking system, a second secure content request including at least an authentication token, and a project identifier associated with the secure document; receiving, at the documentation system from the issue tracking system, a secure content, embedding the secure content into the secure document; and serving the secure document to a client application associated with the authentication token.

Related and additional embodiments may include a configuration in which the authentication token may be generated by a single sign-on service.

BRIEF DESCRIPTION OF THE DRAWINGS

Reference will now be made to representative embodiments illustrated in the accompanying figures. It should be understood that the following descriptions are not intended to limit this disclosure to one included embodiment. To the contrary, the disclosure provided herein is intended to cover alternatives, modifications, and equivalents as may be included within the spirit and scope of the described embodiments, and as defined by the appended claims.

The use of the same or similar reference numerals in different figures indicates similar, related, or identical items.

Figure 1:
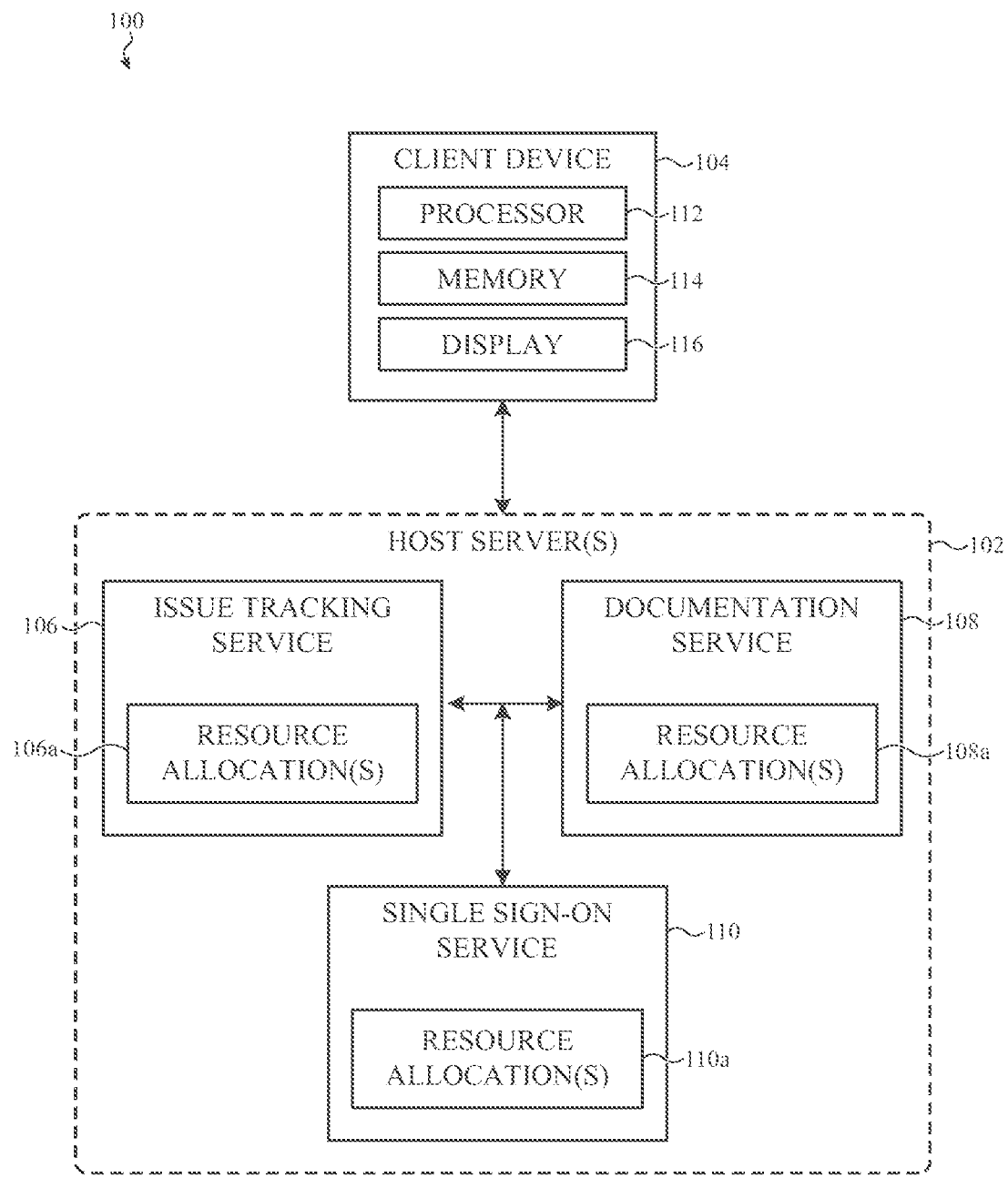
FIG. 1 depicts a collaborative work environment including multiple discrete collaboration tools, such as described herein.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

Embodiments described herein relate to methods and systems displaying content stored in a distributed manner in a collaborative work environment in a common user interface, thereby eliminating a need for end users to context switch between different collaboration tools to obtain related information or content.

In particular, as noted above, an organization can establish a "collaborative work environment" by self-hosting, or providing its employees with access to, one or more platforms or services to facilitate cooperation and completion of work related to common goals. In many cases, a collaborative work environment is defined by multiple purpose-configured "collaboration tools" or services (e.g., issue tracking systems, documentation systems, code repository systems, and so on), which may be leveraged by teams to share information.

However, also as noted above, in many circumstances, content stored in one collaboration tool may be related to and/or relevant to content stored in another collaboration tool. In this manner, in order to understand a current status of a project or goal, users of the collaborative work environment are required to regularly switch between different collaboration tools in order to understand current status of work related to a common goal.

As may be appreciated by a person of skill in the art, context switching between different tools requires substantial time that may be more efficiently dedicated to other tasks or work products. More specifically, in many constructions, a user may be required to log into a first collaboration tool, access information from that tool, and thereafter access a second collaboration tool to access information from that tool. The processes of logging into, searching for, and finding information between related content stored in different collaboration tools is time consuming.

As one specific example, a collaborative work environment can include a documentation system and an issue tracking system. The issue tracking system can be leveraged by a team of software developers to track bugs in software and feature requests, as two non-limiting examples. The documentation system may be leveraged by the same team to document meeting notes, project goals, and overall team dynamics, policies, and protocols. In these examples, both members of the software development team and managers of that team may, from time to time, be required to access both the documentation system and the issue tracking system in order to understand project status.

For example, in some cases, a manager of the team of software developers may need to understand what overall project status for a particular project in advance of a meeting with leadership. In this example, the manager may access the issue tracking system via a web browser. Thereafter, the manager inputs credentials to the issue tracking system.

Once the manager has been authenticated and/or authorized to access the issue tracking system, the manager may search the issue tracking system to find a page tracking issues and project status related to the project. Once such a page is loaded, the manager can find within that page an overall project status (e.g., percent complete, days behind/ahead of schedule, and so on).

Once this information is collected by the manager, the manager may access the documentation system via the web browser. Thereafter, as with the issue tracking system, the manager inputs credentials (which may be the same or different from the credentials associated with the issue tracking system) to the documentation system.

Once the manager has been authenticated and/or authorized to access the documentation system, the manager may search the documentation system to find a page providing information about the project, such as a statement of project goals and/or meeting notes from a recent team meeting. Once such a page is loaded, the manager can find within that page content related to the project (e.g., project goals, descriptions, team members, and so on).

It may be appreciated in view of the foregoing example, that the manager may only be able to provide comprehensive information to leadership after having accessed both the issue tracking system and the documentation system. A person of skill in the art may readily appreciated that this interaction schema is not an efficient use of the managers time.

In yet further examples, other problems may be introduced that complicate processes of interacting with different collaboration tools of a collaborative work environment. For example, as may be appreciated by a person of skill in the art, some collaboration tools implement a server-client relationship in which a client application, executing at a client device, is configured to access a host server or service that, in turn, is configured to provide back-end/server-side functionality of a particular collaboration tool.

In a more simple phrasing, some collaboration tools are associated with individual client applications installed on and executable by client devices used by end users of those collaboration tools. In this circumstance, continuing the preceding example, the manager may be required to install (and/or maintain updated installations of) a first client application associated with the issue tracking system and a second client application associated with the documentation system. In turn, the manager may be required to launch the first client application, log into that application, search for and obtain information from that application and repeat this process with the second client application.

These foregoing examples of conventional collaborative work environments are not exhaustive; it may be appreciated that generally and broadly information in multiple collaboration tools may be required by a particular user at a particular time and that conventional solutions do not provide a convenient means of quickly accessing that information.

One conventional solution to the foregoing problem involves manually taking and updating screenshots of a progress indicator of an issue tracking system in a related document of a documentation system. However, as may be readily appreciated, the usefulness of a screenshot wanes with time as the information within the screenshot becomes stale. This problem may be exacerbated by the size of an organization, potentially leading to many documents stored in a documentation system having outdated and/or irrelevant screenshots embedded therein.

Accordingly, embodiments described herein reference systems and methods that overcome the foregoing and other related problems of presenting current, reliable, and secure access to content generated in different collaboration tools. More particularly, the embodiments described herein are configured to leverage one collaboration tool to access information in another collaboration tool, merging content from both tools into a common user interface.

Although there are many examples and constructions contemplated herein, for simplicity of description, the embodiments that follow reference a collaborative work environment that includes a documentation system and an issue tracking system. In these examples, the documentation system is configured to access the issue tracking system in order to display content from the issue tracking system within a page rendered by the documentation system. This is merely one example, and other types of collaboration tools and integrations therebetween are possible in view of the description provided herein.

In one construction, a documentation system can render a graphical user interface that allows a content creator to link that page to information contained in the issue tracking system. For example, when creating a page in the documentation system, an option may be provided in the graphical user interface to insert content stored in the issue tracking system. An example content stored in the issue tracking system may be a progress chart, such as a Gantt chart or other progress checking schedule. For example, the content may include a graphic aggregating status information of one or more tasks associated with a project tracked by the issue tacking system. In some examples, the graphic can be presented as a calendar, list of tasks alongside progress percentages and/or visualizations having a dimension (e.g., length or width or radius) based on progress percentages of tasks, groups of tasks, or projects and so on. A person of skill in the art appreciates many graphical visualizations of progress are possible.

After selecting this content from the issue tracking system, the documentation system may record and/or otherwise save a project identifier, content identifier, or URL or any other data or metadata that may be used, at a later time, to query the issue tracking system to retrieve the selected content. For simplicity of description the embodiments that follow reference a project identifier as one example of a data item that may be used to identify a user-selected content stored in a first collaboration tool that may be used at a later time by a second collaboration tool to retrieve that content.

As a result of the selection by the user in the documentation system, the documentation system can store the project identifier for later use. In other words, the page created by the user in the documentation system can include a data item or data structure that references content stored in the issue tracking system.

In addition, in some embodiments, the documentation system can provide one or more options to the user to display the content from the issue tracking system in a particular manner. For example, the documentation system may provide to the user an option to display only a particular subset of the selected content, such as a specific board or section of a Gantt chart or schedule. In these examples, more broadly, the documentation system may store within a page not only a project identifier, but also one or more identifiers or format preferences that inform the documentation system how the content obtained from the issue tracking system should be rendered.

As a result of these and other described embodiments, a user in a collaborative work environment can access data from multiple collaboration tools in the collaborative work environment from a single user interface. Namely, a user interface of the collaboration tool through which the particular user prefers to access content.

For example, continuing the example above, a manager may prefer to only use the documentation system. In this example, the manager may not have installed on the manager's client device a client application configured to access the issue tracking system. In this construction, the manager may leverage a client application configured to access the documentation system to request a particular page related to the project of interest to the manager.

Once the manager access the page through the client application of the documentation system, a credential or session token generated by the documentation system when authenticating the credentials of the manager can be forwarded to the issue tracking system. In response to this request, the issue tracking system can forward data requested by the page, namely data or content identified by the project identifier saved in the page of the documentation system as described above. Thereafter, the documentation system can be configured to merge the content received from the issue tracking system into the page stored by the documentation system that was originally requested by the manager.

From the manager's perspective, the manager only requests access to the documentation system and is presented with a single user interface that merges and/or obtains content from the issue tracking system and from the documentation system. In this manner, there is no need for the manager to burden herself with maintaining access to the issue tracking system and/or continually updating, knowing how to use, and/or otherwise interacting with the issue tracking system or its associated web addresses or client applications.

In view of the foregoing examples, it may be appreciated that generally and broadly embodiments described herein reference systems and methods for rendering data/content from multiple locations in a single graphical user interface. More specifically, one collaboration tool can store a by-reference value to content stored in another collaboration tool such that when the first content is access, the by-reference value can be used to obtain content from the second collaboration tool. These two secure contents can be merged, and a single user interface can be shown to a user.

In many cases, as noted above, access to the second collaboration tool can be over a secure communications channel. In other words, the first collaboration tool may be configured to forward a token associated with an authenticated session to the second collaboration tool so that the second collaboration tool is ensured that access to the data stored therein is permitted.

In some cases, a collaborative work environment as described herein includes a single-sign on service configured to manage access to one or more of the collaboration tools of the collaborative work environment. Although many configurations are possible, a single-sign on service as described herein may be configured to receive user credentials, such as a username, password, and/or authentication or authorization token, and upon successful validation of those inputs against a user/role database, the single-sign on service is configured to return a time-limited cryptographic token that serves as a proxy for credentialed/session access to one or more of the collaboration tools of the collaborative work environment. In a more simple phrasing, a single-sign on service as described herein is configured to receive, as input, one or more credentials and to provide as output, a session token, also referred to as a single sign-on token. Herein, single-sign may be abbreviated to "SSO" for convenient reference.

In a collaborative work environment including a single-sign on service, each collaboration tool may be configured to receive as input an SSO token generated by the single-sign on service. The collaboration tool can internally validate the SSO token or, in some cases, can communicably couple to the single-sign on service to determine whether the SSO token is still valid. Upon validating the SSO token, the collaboration tool can provide access to its content to the bearer of the token. In many cases, the bearer of the SSO token will be a client application or web browser executing at a client device.

In view of the foregoing example in which a collaborative work environment includes a single-sign on service, some embodiments described herein may be configured to leverage an SSO token to obtain information from a second collaboration tool from a first collaboration tool. For example, a first collaboration tool may receive an SSO token from a client application configured to integrate with that collaboration tool. The SSO token, as noted above, may be generated and/or validated by the single-sign on service. Once the first collaboration tool receives and validates the token, access to content stored by the first collaboration tool can be provided to the bearer of the token, namely a client application executing on a client device that submitted the original request for content to the first collaboration tool.

Once the first collaboration tool receives, from the client application/device, a request for content, the first collaboration tool can be configured to determine whether that content contains a by-reference value that corresponds to and identifies content stored in another collaboration tool. Upon determining that the requested content does contain such a by-reference value, the first collaboration tool can be configured to (1) determine which other collaboration tool the by-reference value is associated with and (2) generate a request to that collaboration tool, the request including the original SSO token.

In response to the request (including the SSO token) received from the first collaboration tool, the second collaboration tool can return the content identified by the by-reference value. Once the first collaboration tool receives the response from the second collaboration tool, the first collaboration tool can merge its own content (requested by the client application/device) with the content obtained from the second collaboration tool. Thereafter, the merged content can be rendered in a graphical user interface of the client application/device that made the original request to the first collaboration tool.

For simplicity of description, content stored by a collaboration tool is referred to as either or both "team-generated content" or "user-generated content." These phrases refer to any and all content generated by a team and/or any and all metadata describing such content. For example, a progress chart or Gantt chart or schedule generated by summarizing or displaying the combined status of one or more tasks or issues tracked by an issue tracking system is team-generated or user-generated content, as such terms are used herein.

In view of this definition, it may be appreciated that embodiments described herein generally and broadly reference systems and methods for securely accessing and merging team-generated or user-generated content stored by a first collaboration tool with team-generated or user-generated content stored by a second collaboration tool. Secure access to content stored by each tool may be facilitated by SSO tokens exchanged between client devices, client applications, server-side host services, and/or other modules or portions of a collaboration tool or, more generally, a collaborative work environment. These SSO tokens are generated by, and/or validated by, a single-sign on service.

Embodiments described herein may be particularly useful to an organization self-hosting, or providing its employees with access to, a number of different platforms and/or software services to establish a collaborative, cooperative and efficient work environment. Herein, such software services can be referred to as "collaboration tools" or "collaboration services."

Example collaboration services such as described herein can include but may not be limited to: messaging services; telecommunication services; videoconferencing services; issue tracking services; repository services; documentation services; document management systems; knowledge sharing systems; project management services; enterprise resource planning services; supply chain management services; and so on. Any content added to any of these services, including input(s) provided to customize a particular instance (or tenant instance, session, or environment) of a particular collaboration service, can be considered user-generated or team-generated content as described herein.

One example of a collaboration service/software service, as described herein, is a project management system or tool that can be implemented in whole or in part as an instance or tenant of an instance of software executed by a container, a virtual server, or a physical server (or other computing appliance or combination of appliances) that provides a team of individuals with a means for communicating and exchanging information with one another. All information exchanged through and/or added to a project management system or tool can be considered team-generated or user-generated content, as described herein.

In some examples, a collaboration service can be configured for use by a software development team to exchange information that can facilitate the completion and assignment of discrete tasks related to software development projects from creation of new user stories (i.e., user-perspective feature requests or desired functionality), through proof of concept testing, through integration testing, through release of software to one or more users, and through reporting and fixing of software errors.

In many cases, the project management tool can track progress of a given project by, for example, calculating a percentage of open tasks remain before a project is complete and/or averaging percent complete scores associated with different tasks of a particular project. Each data item, including progress tracking information and content, associated with each above-described function can be considered team-generated or user-generated content, as described herein.

In other cases, a collaboration service can be configured for non-software related purposes, such as for use by a human resources team, an information technology support group, and so on. As with other examples introduced above, any configuration or addition of information to any collaboration tool described herein can be considered team-generated or user-generated content, as described herein.

In view of the foregoing it may be appreciated that generally and broadly a collaboration tool, such as described herein, can be used to (1) facilitate exchange any quantity of team-generated or user-generated content including files, text content, or information, (2) facilitate text, audio, or video communication, or (2) to facilitate any other suitable collaboration or communication purpose, such as by generating one or more charts or graphics (or other displays or dashboards) that convey information stored by that tool, in aggregate. In this manner, a collaboration tool increases efficiency of a team of individuals working on a common goal or project by increasing the speed by which information can be shared between team members, between supervisors and subordinates, and between management and staff.

To perform these functions, a collaboration tool as described herein, however configured or used by a team of individuals or an organization, can implement a client-server architecture in which a host server or service associated with the collaboration tool receives requests from and provides responses to (some or all of which may comply with a communication protocol such as HTTP, TCP, UDP, and the like) one or more client devices, each of which may be operated by a user of the collaboration tool.

In other cases, a request-response architecture may not be required and other communication and information transaction techniques may be used. For simplicity of description, examples that follow reference a request-response architecture, but it may be appreciated that different collaboration tools may be configured to serve and/or host information, including team-generated or user-generated content, in a number of suitable ways.

In these examples, more specifically, a host server supporting one or more functions of a collaboration tool such as described herein can serve information, including team-generated or user-generated content, to a client device and, in response, the client device can render a graphical user interface on a display to present at least a portion of that team-generated or user-generated content to a user of that client device.

As a result of these constructions, a client device and/or a first collaboration tool can be configured to securely access content from a second collaboration tool in order to merge content from two collaboration tools into a single graphical user interface. Information security can be maintained by exchanging session information between collaboration tools and/or appending SSO tokens to each (or many) requests between collaboration tools. Such configurations prevent unintended information disclosure.

It may be appreciated that multiple configurations of a system as described above are possible. For example, in some constructions, a client device or more particularly, a client application executing on a client device, can be configured to query both a first collaboration tool (for which the client application is purpose-configured to access) and a second collaboration tool. In order to query the second collaboration tool, the client application may be provided with an API schema or definition, which in turn may be embedded or saved in a particular page of the first collaboration tool.

The API schema, which may be presented in any suitable form or format, may inform the client application how to access and/or query data from the second collaboration tool. In other cases, the client application may be configured to access multiple collaboration tools, despite that it is purpose configured to access only the first collaboration tool (e.g., a documentation service application may be configured or configurable to access multiple different other collaboration tools). Generally and broadly, in these examples, the client application may be configured to merge content form multiple collaboration tools.

In other cases, a first collaboration tool may be configured to communicate directly with a second collaboration tool. In these examples, the first collaboration tool may insert content obtained from the second collaboration tool into content stored by the first collaboration tool prior to serving the merged content to the client application. These constructions may be preferred in some implementations in order to reduce complexity of client applications and client application support.

In yet other examples, a collaborative work environment can include one or more query gateways configured to receive a query in a query gateway language, such as GraphQL. In these examples, the query gateway can serve as a central point between multiple collaboration tools, and can be configured to parse a request from a first collaboration tool to determine an appropriate second collaboration tool from which to obtain information to service the request of the first collaboration tool.

These foregoing examples are not exhaustive; it may be appreciated that generally and broadly the embodiments described herein operate by storing a by-reference value (e.g., a product identifier, a URL, a foreign database key, a UUID, or any other suitable identifier) that serves as a proxy reference to data or content stored in another collaboration tool.

When rendering a page, a collaboration tool can determine whether a by-reference value is contained in that page and/or is associated with that page. Upon determining that a particular page (e.g., a user-generated content) contains a by-reference value, the first collaboration tool can extract the by-reference value, can identify a second collaboration tool associated with the by-reference value, can generate a request to the second collaboration tool containing the by-reference value and an SSO token, and can receive from the second collaboration tool a second content responsive to the request.

Thereafter, the first collaboration tool can insert the second content into the original content in order to show merged content to a user of the first collaboration tool. The process of inserting the second content (obtained from the second collaboration tool) into the first collaboration tool can be accomplished in a number of ways, some of which are described in greater detail below.

A simplified portion of example algorithm, presented for clarity and simplicity in pseudocode, that may be executed by the first collaboration tool to extract content from a second collaboration tool, in response to determining that content stored in its own database includes at least one by-reference value, follows:

```
@app.route("/query/<query>")
def process_query (query){
    first_content = self.query_database(query)
    if (first_content.matches(pattern){
        by_ref_value = extract_remote_reference(first_content)
```

```
    target_tool = identify_tool_from(by_ref_value)
    second_content = target_tool.query_database(by_ref_value)
    first_content = first_content.insert(second_content)
  }
  return first_content
}
```

The foregoing example is merely one example. As noted above, such an algorithm may be executed in whole or in part by any suitable server or service operated within a collaborative work environment. For example, in some cases, the foregoing algorithm may be executed by a documentation system, such as described above. In other cases, the foregoing algorithm may be executed by a client device executing on a client application in communication with a documentation system and/or an issue tracking system.

Further, it may be appreciated that the simplified foregoing example may be implemented in a different manner than shown. In some examples, the operation of inserting the second content in the first content can include locating a tag within the first content, such as a tag defined by a markup language defining the format of the first content. In other cases, the second content can be inserted at a location at which the by-reference value was located.

In other cases, the by-reference value may not be a single value, but may be a data structure. As noted above, the data structure can include a by-reference value, an indicator of a particular collaboration tool, a project identifier, a board identifier, or any other suitable by-reference value. In some cases, one or more of the reference values of the data structure may be encrypted so that accidental disclosure of a page containing the data structure does confer any specific information about the content referenced by the value.

These foregoing and other embodiments are discussed below with reference to FIGS. 1-6. However, those skilled in the art will readily appreciate that the detailed description given herein with respect to these figures is for explanation only and should not be construed as limiting.

FIG. 1 depicts a collaborative work environment including multiple discrete collaboration tools, such as described herein. The collaborative work environment 100 includes a set of host servers 102 that may be configured to instantiate one or more individual collaboration tools that cooperate to define the collaborative work environment 100. More particularly, the set of host servers 102 can be configured to communicably couple, either collectively (e.g., through a single or limited set of gateway services) or individually with a client device 104. In many cases, although not required, the client device 104 is configured to communicably couple to one or more of the host servers of the set of host servers 102 across the open internet, but this may not be required of all embodiments. In some examples, the client device 104 can be configured to access a private network to which each or all of the host servers of the set of host servers are coupled as well; many communications protocols and networks may be used, the depicted embodiment is merely one example construction. Similarly, it may be appreciated that in some examples, the client device 104 is communicably coupled to one or more host servers via one or more intermediate elements or networking devices, such as firewalls, packet shapers, antivirus scanners, gateways, and so on. A person of skill in the art may appreciate that the simplified system diagram illustrated in FIG. 1 is not exhaustive of all network architectures that can support a system as described herein.

As noted above, the collaborative work environment 100 can include multiple independent and purpose configured collaboration tools. In the illustrated example, the collaborative work environment 100 includes an issue tracking service 104, a documentation service 108, and a single sign-on service 110.

Each of the issue tracking service 106, the documentation service 108, and the single sign-on service 110 can be configured to operate as an instance of software independently instantiated over a server system, such as over one or more physical servers associated with the set of host servers 102. In some cases, one or more of the issue tracking service 106, the documentation service 108, and the single sign-on service 110 may be instantiated over the same physical resources (e.g., memory, processor, and so on), whereas in other cases, each of the issue tracking service 106, the documentation service 108, and the single sign-on service 110 are instantiated over different, independent, and distinct physical hardware.

As the manner by which the issue tracking service 106, the documentation service 108, and the single sign-on service 110 are instantiated varies from embodiment to embodiment, FIG. 1 depicts each of the issue tracking service 106, the documentation service 108, and the single sign-on service 110 as supported by dedicated resource allocations. In particular, the issue tracking service 106 is supported by the resource allocation 106a, the documentation service 108 is supported by the resource allocation 108a, and the single sign-on service 110 is supported by the resource allocation 110a.

As with other embodiments described herein, the resource allocations supporting the issue tracking service 106, the documentation service 108, and the single sign-on service 110 can each include a processor allocation and a memory allocation. The processor and memory allocations may be static and/or may be scalable and dynamically resizable.

In many embodiments, the memory allocations of the issue tracking service 106, the documentation service 108, and the single sign-on service 110 include at least a data store or other data base and a working memory allocation. The data store can be configured to provide durable storage for user/team generated content associated with the associated system/service.

As a result of these constructions, each of the issue tracking service 106, the documentation service 108, and the single sign-on service 110 can be instantiated in response to a respective processor allocation accessing from a respective data store at least one executable asset (e.g., compiled binary, executable code, other computer instructions, and so on). Thereafter, the processor allocation can load at least a portion of the executable asset into the respective working memory allocation in order to instantiate respective instances of the issue tracking service 106, the documentation service 108, and the single sign-on service 110.

In further constructions, each of the issue tracking service 106, the documentation service 108, and the single sign-on service 110 may be a multitenant service in which sub-instances and/or tenant-specific environments may be defined upon instantiation of the issue tracking service 106, the documentation service 108, and/or the single sign-on service 110. More generally, it may be appreciated that multiple constructions are possible.

Once each of the issue tracking service 106, the documentation service 108, and the single sign-on service 110 are instantiated, the issue tracking service 106 can be configured to communicably couple to the documentation service 108 and/or the single sign-on service 110. As a result of this construction, the documentation service 108 can obtain content from the issue tracking service 106, and likewise the issue tracking service can obtain content from the documentation service 108.

In many cases, as noted above, each of the documentation service 108 and the issue tracking service 106 are configured to gate access to content stored within a data store of a memory allocation thereof by servicing only queries for information that are accompanied by a session identifier or SSO token provided and/or verified by the single sign-on service 110. In this manner, data security can be ensured while different collaboration tools are communicating with one another.

As with other embodiments described herein, a user of the client device 104 can interact with the collaborative work environment 100 in a number of ways. In particular, in many examples, the client device 104 is configured to access one or more of the collaboration tools of the collaborative work environment 100 in order to display content stored therein.

For example, the client device 104 may be a desktop computing device used by a user of the collaborative work environment 100. In this example, the user may execute a client application on the client device 104 in order to access content from the issue tracking service 106 or the documentation service 108. In some cases, as noted above, the client application may be a web browser application and/or may be a purpose configured application configured to access only one of the collaboration tool of the collaborative work environment.

More particularly, the client device 104 can leverage a processor 112 to access a memory 114 to access at least one executable asset from a durable, long-term, allocation of that memory 114. Upon accessing the executable asset from the memory 114, the processor 112 can be configured to load that executable asset into working memory in order to instantiate an instance of the above-referenced client application, which may be a browser or an application specific to one or more of the collaboration tools of the collaborative work environment 100. Once instantiated, the client application can be configured to render a graphical user interface that may be shown and/or displayed in an active display area of a display 116.

Once instantiated, the client application can be configured to access, as one example, the document documentation service 108. In particular the client application may be configured to request from the documentation service 108 a particular page. In response to the request, the documentation service 108 can access a database or more than one databases or data stores, whether local or remote, in order to service the request by the client application.

Prior to rendering the requested content in the graphical user interface, the requested content returned by the documentation service 108 may be analyzed by one of the documentation service 108 itself and/or the client application. As noted above, the analysis of the content may be performed to determine whether a by-reference value is contained within the content. In other cases, the content may be analyzed to determine whether a by-reference value is contained within a memory structure or data structured contained within the content.

In some cases, the target data (e.g., the by-reference value, URL, or other indicator referencing data in another database of another collaboration tool) can be contained between two tags formatted according to a specified markup language. For example, in some cases the by-reference value may be a UUID disposed between two tags formatted according to HTML5 or another similar standard. As one example the string "<remote-content>11111111-2222-3333-4444-555555555555</remote-content>" may be embedded into a text document stored by the documentation service 108. In this example, the documentation service 108 and/or the client application can be configured to identify the tags <remote-content> and </remote-content>, and to extract the UUID enclosed thereby. From the format of the UUID extracted from these tags, the documentation service 108 and/or the client application may be able to determine that the UUID corresponds to the issue tracking service 106 or, in other cases, to another collaboration tool of the collaborative work environment 100.

In other cases, such as noted above, the target data may include a data structure, such as a JSON formatted data structure. In this example, the target data may be extracted as plain text by the documentation service 108 and/or the client application and, thereafter, can be used to instantiate a data object having attributes with data that can inform the documentation service 108 and/or the client application which collaboration tool and/or which portion of which collaboration tool should be accessed to access associated data or content.

Once the documentation service 108 and/or the client application have extracted the target data from the content retrieved by the documentation service 108 from a database of the documentation service 108, the documentation service 108 and/or the client application can construct a request directed to the identified second collaboration tool, which may be the issue tracking service 106.

In response to sending the request, the documentation service 108 and/or the client application may anticipate receiving a response to the request that includes the requested content. Likewise, the collaboration tool that is the target of the request may be configured to service the request by converting the received request into a query suitable to submit to a database of that system.

For example, in one embodiment the documentation service 108 receives a request, including an SSO token generated and/or validated by the single sign-on service 110, from the client device to render a page at a path "/epic/project." In response to receiving this request, the documentation service 108 can extract from a database text and/or multimedia content associated with a document associated with the address "/epic/project." On receiving this "first content," the documentation service 108 and/or the client device is configured to parse through the first content, and may determine that the first content includes the string: "<iframe src='/is sue tracking service/project/1234/progress_chart'></iframe>." From this string, the documentation service 108 and/or the client application can determine that a request for second content should be constructed and submitted to the issue tracking service 106. The request may include a project identifier of "1234" and a board or display identifier of "progress_chart." The request may also include the SSO token.

In response to receiving the request, the issue tracking service 106 may query its own internal database for a project identifier 1234, and may return to the documentation service 108 and/or the client application a response including second content that corresponds to both the project identifier and the board identifier of "progress_chart." Thereafter, the second content can be inserted between the <iframe> tag and the </iframe> tag to combine and/or merge the first content and the second content.

In other cases, an SSO token may be rejected by the second collaboration tool. In such cases a default message may be inserted into the first content. In some examples, the default message may include an indication that authorization for accessing information from the second collaboration tool is not permitted. In other cases, no content may be shown.

Being rendered with the first content, the second content may be rendered according to format rules and/or other display restrictions defined by the graphical user interface rendered by the client application. This may include CSS rules, resizing rules, maximum widths, maximum height, and so on.

More generally and broadly, it may be appreciated that a system such as shown and described in reference to FIG. 1 can combine and merge content from multiple collaboration tools of a collaborative work environment in a number of suitable ways.

These foregoing embodiments depicted in FIG. 1 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, a collaborative work environment such as described in reference to FIG. 1 can include more than just an issue tracking system and a documentation system and a single-sign on service; any suitable number of individual or purpose-configured collaboration tools can be used.

Some of the collaboration tools of a collaborative work environment can be self-hosted and/or local to a particular end user. In other cases, one or more collaboration tools of a collaborative work environment may be executed on remote host servers. In a more general phrasing it may be appreciated that some collaboration tools of a collaborative work environment can be accessed via a first network, which may be a closed network, whereas others may be accessed via the open Internet.

In still further examples, some collaboration tools may be configured to provide access to user-generated or team-generated content stored therein by rendering a graphical user interface within a web browser of a client device. In other cases a collaboration tool may implement a client-server architecture in which a client device executes an instance of a purpose configured client application that is configured to access a purpose-configured server-side host service of a collaboration tool. More generally, it may be appreciated that some collaboration tools may be configured to be accessed via a web browser whereas others may be configured to be accessed by a particular client application.

Similarly, it may be appreciated that a client device may be configured to access a remote server or remote host server (either directly or via one or more proxy services) either via a client application or a web browser. In some cases, a web browser may be considered a client application as described herein.

Further, it may be appreciated that a client device can be any suitable electronic device. Example electronic devices include laptop devices, desktop devices, tablet devices, cell phone devices, smart appliances, industrial control devices, display devices, and so on. Any suitable electronic device, whether mobile or stationary may be used within a system as described herein.

In addition, it may be appreciated that any number of different collaboration tools can insert and/or merge content obtained from other collaboration tools as described herein.

Figure 2:
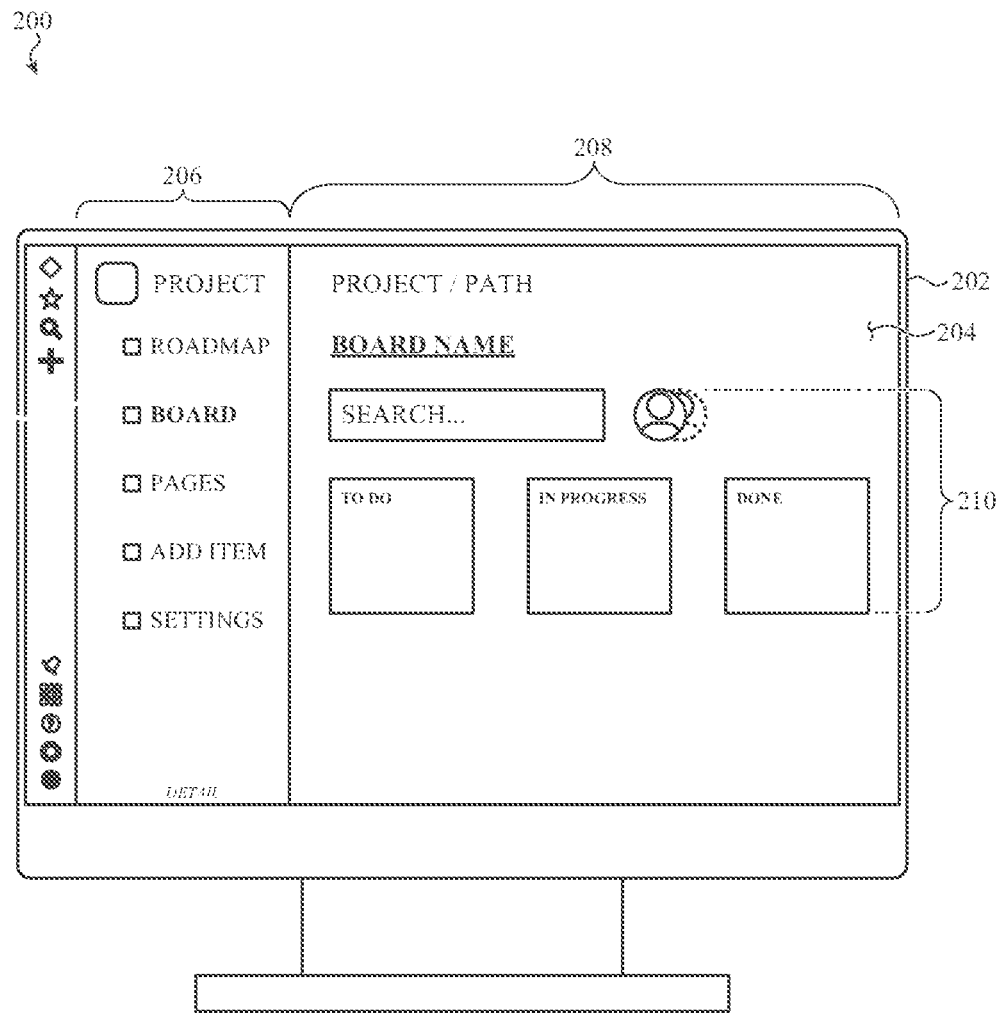
FIG. 2 depicts a client device executing an instance of a client application configured to access server-side functionality provided by, and content stored by, an issue tracking service of the collaborative work environment of FIG. 1.

For example, FIG. 2 depicts a client device executing an instance of a client application configured to access server-side functionality provided by, and content stored by, an issue tracking service of the collaborative work environment of FIG. 1.

In this example, the client device 200 is shown as a desktop computing device, although it is appreciated that this is merely one example; other constructions include other electronic devices.

The client device 200 includes a housing 202 and a display within the housing that is configured to render a graphical user interface 204 associated with an issue tracking system.

The graphical user interface 204 of the client device 200 can be rendered at least in part by a client application executing over a processor and/or memory allocation associated with the client device 200 and disposed, at least in part, within the housing 202.

The client application, as noted with respect to other embodiments described herein, can be configured to communicably coupled to an issue tracking system and to a single-sign on service. Initially, the client application can couple to the single-sign on service to obtain an SSO token, such as described above. The SSO token can be used to access the issue tracking system and may be associated with a particular role, such as a role in a member of a particular team, particular department, or particular company or tenant of a multitenant service.

A user of the client device 200 can manipulate the graphical user interface 204 to request particular desired content stored by the issue tracking system be displayed in the graphical user interface 204. For example, the graphical user interface 204 may provide a search feature so that the user can quickly find information by searching therefore.

More specifically, in response to a request from the client application that includes a project identifying string (e.g., query, project ID, and so on) and the SSO token, the issue tracking system can return first content back to the client application to render in the graphical user interface 204.

The graphical user interface 204 and/or the client application can be configured to render the first content in any suitable way, organized in any suitable manner; the depicted graphical user interface layout is understood to be a singular example.

For example, as illustrated, the graphical user interface 204 includes a first column 206 configured to provide various selectable graphical user interface elements that, when selected by a user, cause the graphical user interface 204 of the client application to display different information related to a particular project, such as a project roadmap, one or more project task boards (e.g., Kanban boards), one or more project pages, one or more tasks, and/or one or more display settings.

Once a selection is made in the first column 206, a second column 208 may be shown which provides detailed information corresponding to the selection.

In either the first column 206 or the second column 208, information from one or more other collaboration tools, such as described herein, can be shown. For example, in the second column 208, the board information 210 may be obtained from a separate issue tracking system. In other cases, information from other collaboration tools can be shown using the methods and systems described herein. As a result of these constructions, a user of the issue tracking system need not access any other issue or project management system in order to consume content related to the selected project.

Figure 3:
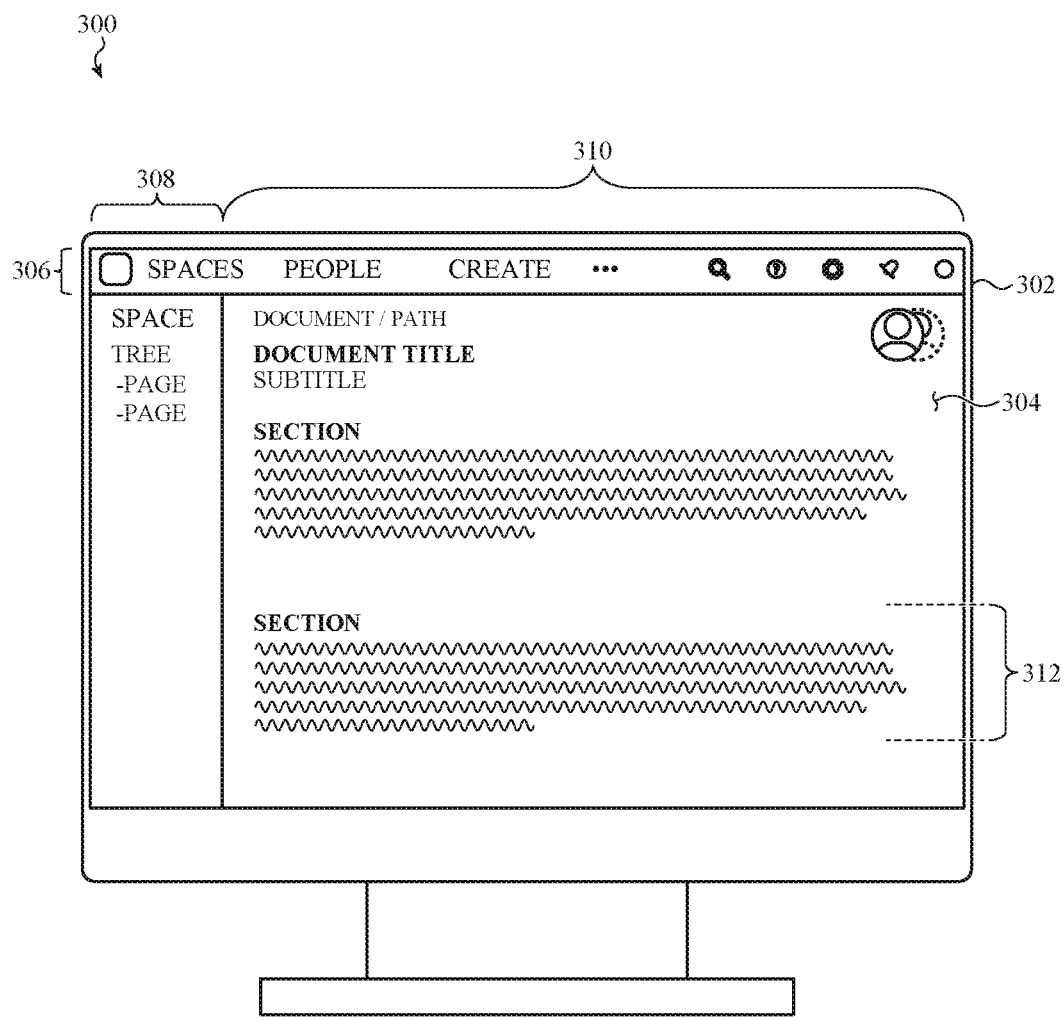
FIG. 3 depicts a client device executing an instance of a client application configured to access server-side functionality provided by, and content stored by, a documentation service of the collaborative work environment of FIG. 1.

FIG. 3 depicts a client device executing an instance of a client application configured to access server-side functionality provided by, and content stored by, a documentation service of the collaborative work environment of FIG. 1.

In this example, the client device 300—similar to the client device 200 shown in FIG. 2—is shown as a desktop computing device, although it is appreciated that this is merely one example; other constructions include other electronic devices.

As with other described embodiments, the client device 300 includes a housing 302 and a display within the housing that is configured to render a graphical user interface 304 associated with a documentation system.

Similar to other described embodiments, the graphical user interface 304 of the client device 300 can be rendered at least in part by a client application executing over a processor and/or memory allocation associated with the client device 300 and disposed, at least in part, within the housing 302.

The client application, as noted with respect to other embodiments described herein, can be configured to communicably coupled to an documentation system and to a single-sign on service. Initially, the client application can couple to the single-sign on service to obtain an SSO token, such as described above. The SSO token can be used to access the documentation system, and may be team-specific, user-specific, project-specific or otherwise associated with a particular role.

A user of the client device 300 can manipulate the graphical user interface 304 to request particular desired content stored by the documentation system be displayed in the graphical user interface 304. For example, the graphical user interface 304 may provide a search feature so that the user can quickly find information by searching therefore.

More specifically, in response to a request from the client application that includes a document or page identifying string (e.g., query, document or page ID, and so on) and the SSO token, the documentation system can return first content back to the client application to render in the graphical user interface 304.

The graphical user interface 304 and/or the client application can be configured to render the first content in any suitable way, organized in any suitable manner; the depicted graphical user interface layout is understood to be a singular example.

For example, as illustrated, the graphical user interface 304 includes a selection header 306, configured to provide various selectable graphical user interface elements that, when selected by a user, cause the graphical user interface 304 of the client application to display different information related to a particular document, space, or page, such as a document or page tree or structure, one or more documents, images, or sections.

Once a selection is made in the section header 306, various columns of information can be shown, such as in a first column 308 and a second column 310. These columns can be configured and/or organized to display detailed information corresponding to the selection made in the selection header 306.

For example, in either the first column 308 or the second column 310, information from one or more other collaboration tools, such as described herein, can be shown. For example, in the second column 310, section information 312 can be obtained from a separate documentation system, and can be shown alongside and/or within the first content rendered in the graphical user interface 304.

In yet other cases, information from other collaboration tools can be shown using the methods and systems described herein. As a result of these constructions, a user of the documentation system need not access any other document or page management system in order to consume content related to the selected document or page.

These foregoing embodiments depicted in FIGS. 2-3 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

For example, as noted above, the example graphical user interface elements shown in FIGS. 2-3 may not be required of all embodiments. For example, in some cases, an issue tracking system can include different views and/or different user interface elements than those shown. Similarly, a documentation system may include different views and/or different user interface elements than those shown. It may be appreciated further that the graphical user interfaces shown in FIGS. 2-3 may be arranged and/or structured differently depending upon particular client devices.

In addition, it may be appreciated that each of FIGS. 2-3 are described in reference to collaboration tools that are configured to access second content from other collaboration tools of the same type. More specifically, FIG. 2 references a construction in which a first issue tracking system is configured to access information from a second issue tracking system and to display both content in a merged format in a single graphical user interface. In addition, FIG. 3 references a construction in which a first documentation system is configured to access information from a second documentation system.

A construction in which a first collaboration tool is configured to access data from a second collaboration tool of the same type is merely one example. In other cases, content can be shared between different collaboration tools of different types.

Figure 4:
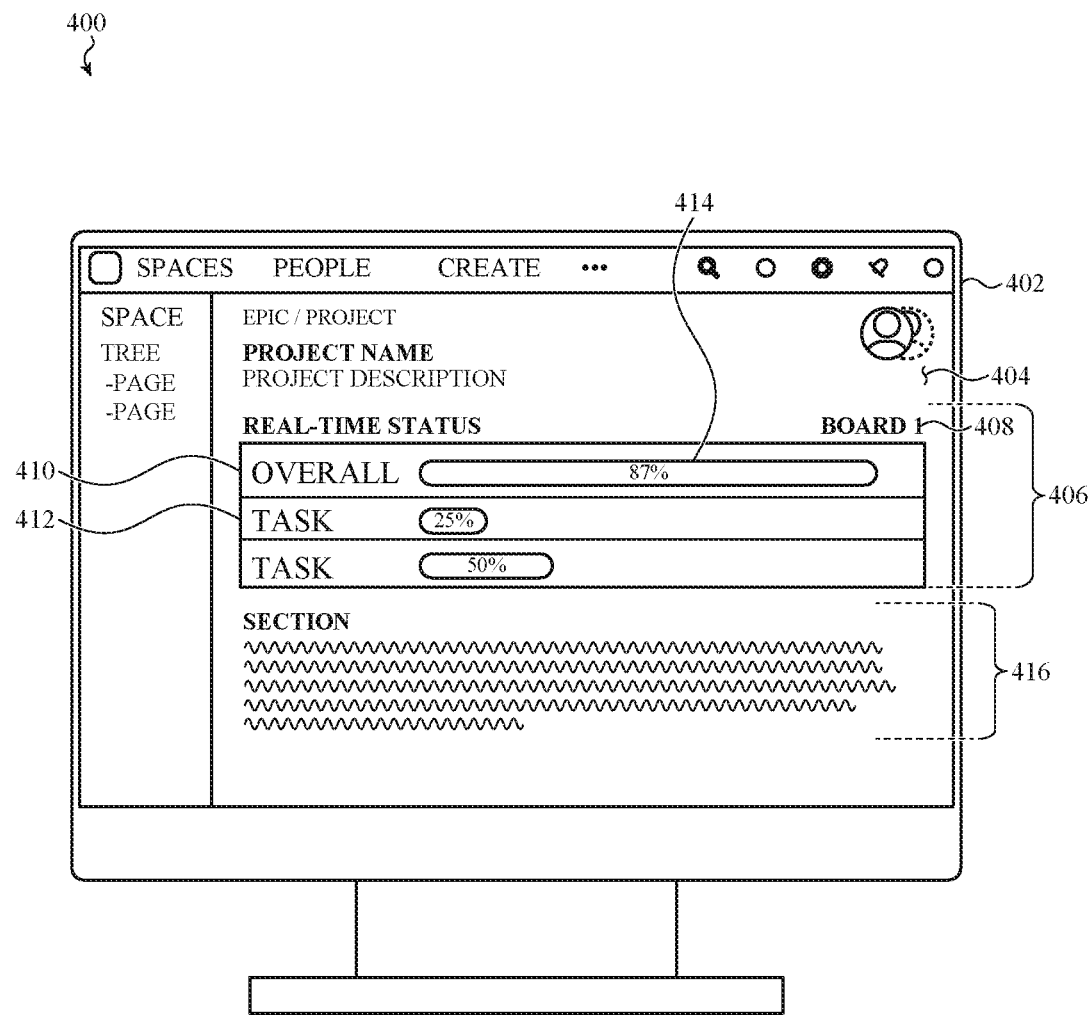
FIG. 4 depicts a client device executing an instance of a client application configured to access server-side functionality provided by, and content stored by, a documentation service of the collaborative work environment of FIG. 1, the client application and/or the documentation service configured to access server-side functionality provided by, and content stored by an issue tracking system of the collaborative work environment of FIG. 1.

For example, FIG. 4 depicts a client device 400 including a housing 402 enclosing a display rendering a graphical user interface 404 in response to executing an instance of a client application configured to access server-side functionality provided by, and content stored by, a documentation service. In addition, the graphical user interface 404 can be configured to display content retrieved from a different type of collaboration tool, namely an issue tracking system. More particularly, within the graphical user interface 404, a first section 406 can be configured to display second content obtained from the issue tracking system. More specifically, the client application can forward an SSO token to an issue tracking system identified by content embedded in the page displayed by the documentation system. In this example, the page displayed by the documentation system (as first content) references a particular project, which may be tracked at least in part by the issue tracking system. Within the first section 406, a board selection user interface element 408 can be shown which can indicate and/or select which board associated with the project tracked by the issue tracking system should be displayed within the graphical user interface of the documentation system. In the illustrated example, a progress chart (e.g., Gantt chart) may be shown which can include progress bars 410, 412 corresponding to progress of individual tasks associated with the selected board tracked by the issue tracking system. In some embodiments, such as shown, an overall project status 414 may likewise be shown.

In some further examples, additional content 416 can be shown, which may be obtained from a separate documentation system or issue tracking system or other collaboration tool.

These foregoing embodiments depicted in FIG. 4 and the various alternatives thereof and variations thereto are presented, generally, for purposes of explanation, and to facilitate an understanding of various configurations and constructions of a system, such as described herein. However, it will be apparent to one skilled in the art that some of the specific details presented herein may not be required in order to practice a particular described embodiment, or an equivalent thereof.

Thus, it is understood that the foregoing and following descriptions of specific embodiments are presented for the limited purposes of illustration and description. These descriptions are not targeted to be exhaustive or to limit the disclosure to the precise forms recited herein. To the contrary, it will be apparent to one of ordinary skill in the art that many modifications and variations are possible in view of the above teachings.

Figure 5:
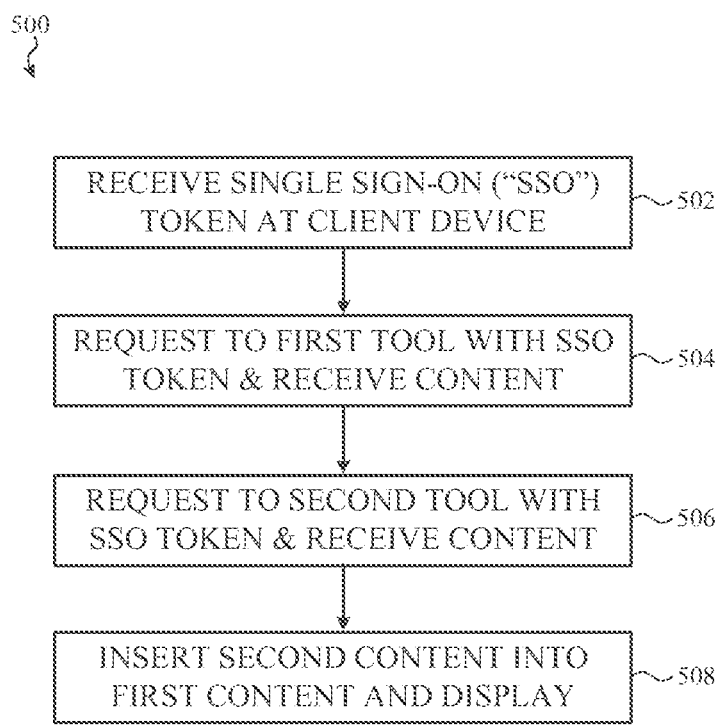
FIG. 5 is a flowchart depicting example operations of a method of operating a client application configured to access a documentation service to access content from an issue tracking service, such as described herein.

FIG. 5 is a flowchart depicting example operations of a method of operating a client application configured to access a documentation service to access content from an issue tracking service, such as described herein. The method 500 can be performed, in whole or in part by any suitable hardware or software or combinations thereof, including a client application, a client device, and/or one or more host services or collaboration tools.

The method 500 includes operation 502 at which a single sign-on token is received at a client device executing a client application, such as a web browser or a purpose-configured client application. Next, at operation 504, a request for first content is submitted to a first collaboration tool. The request includes the SSO token for authentication purpose; in response to the request, the first content is received at the client device. Next, at operation 506, a request for second content is submitted to a second collaboration tool. The second collaboration tool may be the same type of collaboration tool as the first collaboration tool, but this is not required of all embodiments. As with the first request, the second request includes the SSO token for authentication purpose. In response to the second request, the second content is received at the client device. Thereafter, at operation 508, the second content is inserted into the first content and a single graphical user interface is rendered with both content shown.

Figure 6:
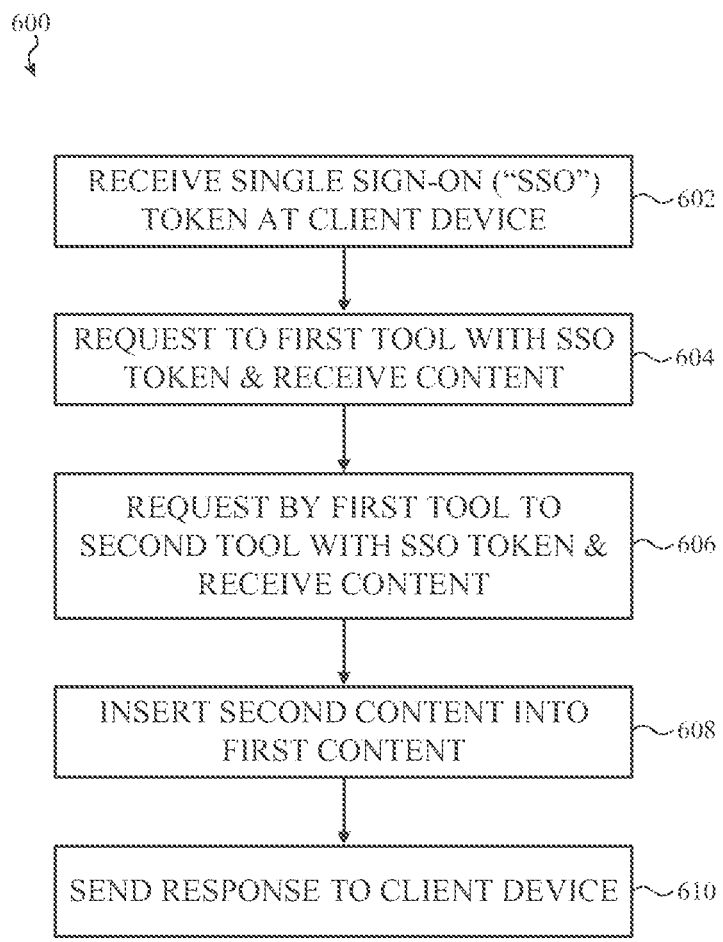
FIG. 6 is a flowchart depicting example operations of a method of operating a documentation service to access content from an issue tracking service, such as described herein.

FIG. 6 is a flowchart depicting example operations of a method of operating a documentation service to access content from an issue tracking service, such as described herein. As with the method 500, the method 600 can be performed, in whole or in part by any suitable hardware or software or combinations thereof, including a client application, a client device, and/or one or more host services or collaboration tools.

The method 600 includes operation 602 at which an SSO token is received at a client device. At operation 604, a request including the SSO token is made to a first collaboration tool for first content. A response with the first content is received. Next, at operation 606, a request is made by the first collaboration tool, with the SSO token, to a second collaboration tool for second content. A response from the second collaboration tool is received at the first collaboration tool, and the response includes the second content. Next at operation 608, the second content is inserted into and/or merged with the first content. Finally, at operation 610, the first collaboration tool sends the merged content to the client device for display to the end user.

As used herein, the phrase "at least one of" preceding a series of items, with the term "and" or "or" to separate any of the items, modifies the list as a whole, rather than each member of the list. The phrase "at least one of" does not require selection of at least one of each item listed; rather, the phrase allows a meaning that includes at a minimum one of any of the items, and/or at a minimum one of any combination of the items, and/or at a minimum one of each of the items. By way of example, the phrases "at least one of A, B, and C" or "at least one of A, B, or C" each refer to only A, only B, or only C; any combination of A, B, and C; and/or one or more of each of A, B, and C. Similarly, it may be appreciated that an order of elements presented for a conjunctive or disjunctive list provided herein should not be construed as limiting the disclosure to only that order provided.

One may appreciate that although many embodiments are disclosed above, that the operations and steps presented with respect to methods and techniques described herein are meant as exemplary and accordingly are not exhaustive. One may further appreciate that alternate step order or fewer or additional operations may be required or desired for particular embodiments.

Although the disclosure above is described in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the some embodiments of the invention, whether or not such embodiments are described and whether or not such features are presented as being a part of a described embodiment. Thus, the breadth and scope of the present invention should not be limited by any of the above-described exemplary embodiments but is instead defined by the claims herein presented.

The foregoing examples and description of instances of purpose-configured software, whether accessible via API as a request-response service, an event-driven service, or whether configured as a self-contained data processing service are understood as not exhaustive. In other words, a person of skill in the art may appreciate that the various functions and operations of a system such as described herein can be implemented in a number of suitable ways, developed leveraging any number of suitable libraries, frameworks, first or third-party APIs, local or remote databases (whether relational, NoSQL, or other architectures, or a combination thereof), programming languages, software design techniques (e.g., procedural, asynchronous, event-driven, and so on or any combination thereof), and so on.

The various functions described herein can be implemented in the same manner (as one example, leveraging a common language and/or design), or in different ways. In many embodiments, functions of a system described herein are implemented as discrete microservices, which may be containerized or executed/instantiated leveraging a discrete virtual machine, that are only responsive to authenticated API requests from other microservices of the same system. Similarly, each microservice may be configured to provide data output and receive data input across an encrypted data channel. In some cases, each microservice may be configured to store its own data in a dedicated encrypted database; in others, microservices can store encrypted data in a common database; whether such data is stored in tables shared by multiple microservices or whether microservices may leverage independent and separate tables/schemas can vary from embodiment to embodiment. As a result of these described and other equivalent architectures, it may be appreciated that a system such as described herein can be implemented in a number of suitable ways. For simplicity of description, many embodiments that follow are described in reference an implementation in which discrete functions of the system are implemented as discrete microservices. It is appreciated that this is merely one possible implementation.

As described herein, the term "processor" refers to any software and/or hardware-implemented data processing device or circuit physically and/or structurally configured to instantiate one or more classes or objects that are purpose-configured to perform specific transformations of data including operations represented as code and/or instructions included in a program that can be stored within, and accessed from, a memory. This term is meant to encompass a single processor or processing unit, multiple processors, multiple processing units, analog or digital circuits, or other suitably configured computing element or combination of elements.

What is claimed is:

1. A method of displaying secure content stored by an issue tracking system of a collaboration work environment within a secure page stored by a documentation system of the collaboration work environment, the method comprising:
    receiving, at a first host server executing a first backend instance of the documentation system, from an instance of a client application providing frontend functionality of the documentation system, the client application executing at a client device operated by a user of the documentation system, a first secure content request:
        identifying the secure page stored by the first host server; and
        comprising an authentication token identifying the user of the documentation system;
    querying, by the first backend instance, a database of the documentation system to obtain the secure page upon determining by the first backend instance that the user identified by the authentication token is authorized to access the secure page;
    parsing, by the first backend instance, the secure page and identifying, by the first backend instance, a content tag designating a by-reference value within the secure page;
    using the by-reference value, by the first backend instance to determine a project identifier corresponding to a project managed by the issue tracking system and a board identifier corresponding to a board associated with the project;
    generating, by the first backend instance, an application programming interface (API) call to the issue tracking system, the API call formatted in accordance with an API schema determined using the by-reference value, the API call including the authentication token, the project identifier, and the board identifier;
    providing the API call, by the first host server to a second host server executing a second backend instance providing backend functionality of the issue tracking system;
    receiving, at the first backend instance from the second backend instance, a response including project timeline data associated with the board identifier and the project identifier, in response to the issue tracking system determining that the user identified by the authentication token is authorized to access the project identified by the project identifier and managed by the issue tracking system;
    embedding, by the first backend instance, a timeline object including the project timeline data at a location corresponding to the content tag in the secure page of the documentation system; and
    generating, by the first backend instance to the client application instance, a response comprising, from the documentation system, the secure page including the embedded timeline object that includes the project timeline data associated with the board identifier and the project identifier.

2. The method of claim 1, wherein the project timeline data depicts at least a subset of a set of issues in a roadmap identified by the board identifier.

3. The method of claim 1, further comprising modifying the embedded timeline object based on a style sheet associated with the secure page.

4. The method of claim 1, further comprising sending the response to the client device.

5. A method of displaying secure content stored in an issue tracking system within a secure page of a documentation system, the method comprising:
    receiving, from a client device at a server executing an instance of the documentation system, a first secure content request:
        identifying the secure page stored by the documentation system; and
        comprising an authentication token identifying a user of the documentation system authorized to access the secure page;
    querying, by the documentation system, a database of the documentation system to obtain at least a portion of the secure page;
    parsing the secure page and identifying a content tag designating a by-reference value within the secure page;
    using the by-reference value identified on the secure page to determine a project identifier corresponding to a project managed by the issue tracking system and a board identifier corresponding to a board associated with the project;
    generating an application programming interface (API) call to the issue tracking system, the API call formatted in accordance with an API schema determined using the by-reference value, the API call including the authentication token, the project identifier, and the board identifier;
    providing the API call, by the documentation system to the issue tracking system;

receiving, at the documentation system from the issue tracking system, a response including project timeline data associated with the board identifier, in response to the issue tracking system determining that the user associated with the authentication token is authorized to access the project identified by the project identifier and managed by the issue tracking system;

embedding, by the documentation system and into the secure page, a timeline object including the project timeline data associated with the board identifier and the project identifier; and serving, by the documentation system, the secure page including the embedded timeline object to a client application executing on the client device.

6. The method of claim 5, wherein the authentication token is generated by a single sign-on service.

7. The method of claim 5, wherein a dimension of the timeline object is defined relative to a width of the secure page when the secure page is rendered by the client application.

8. The method of claim 5, wherein a dimension of the timeline object is defined at least in part by a user setting stored locally to the client application.

9. A client device for displaying content in a collaborative work environment comprising a first host server executing a first backend instance of a documentation service, a second host server executing a second backend instance of an issue tracking service, and a third host server executing a third backend instance of a single sign-on service, the client device comprising:

a display;

a working memory; and a processor configured to load into the working memory at least one executable asset stored in a non-transitory memory to instantiate an instance of a client application providing frontend functionality of the documentation service, the client application instance configured to:

obtain, by the client application, a token from the third host server;

determine that the token from the third host server corresponds to a first user account of a user of the documentation service of the first host server;

provide, from the client application to the documentation service of the first host server, a request for a page of the documentation service, the request including the token;

in response to the request for the page and the token, obtain the page from the documentation service;

in accordance with the user being authorized to view the page provided by the documentation service, display, by the client application, document content of the page in a graphical user interface for providing the frontend functionality of the documentation service;

parse the document content to identify a content tag designating a by-reference value within the document content;

using the by-reference value, determine a project identifier corresponding to a project managed by the issue tracking service and a board identifier corresponding to a board associated with the project;

generate an application programming interface (API) call to the issue tracking service, the API call formatted in accordance with an API schema determined using the by-reference value, the API call including the token, the project identifier, and the board identifier;

provide, from the client application, the API call to the issue tracking service of the second host server;

in response to a successful authentication of a second user account on the issue tracking service using the token provided in the API call, obtain, by the client application from the second host server, a response including project timeline data associated with the board identifier and the project identifier;

merge, at the client application, the project timeline data in line with the document content at a location corresponding to the content tag; and display, in the graphical user interface of the client application, the document content and the project timeline data that have been merged within the document content, the document content from the page provided by the documentation service, and the project timeline data associated with the project identifier for the project managed by the issue tracking service and the board identifier for the board associated with the project.

10. The client device of claim 9, wherein the client application is configured to render the project timeline data according to at least one format rule of the document content.

11. The client device of claim 9, wherein the document content is rendered by the client application in the graphical user interface as HTML.

12. The client device of claim 9, wherein:
the board identifier identifies a roadmap corresponding to progress of at least a portion of the project.

13. The client device of claim 12, wherein the roadmap specifies a set of issues managed by the issue tracking service.

14. The client device of claim 13, wherein the project timeline data depicts at least a subset of the set of issues in the roadmap.

15. The client device of claim 13, wherein the at least a subset of the set of issues in the roadmap are arranged along a width of the displayed project timeline data.

16. The client device of claim 9, wherein obtaining the token comprises:

receiving, via the graphical user interface, a credential to authenticate a session with the single sign-on service;

submitting an authentication request to the single sign-on service, the authentication request based at least in part on the credential; and receiving, in response to the authentication request, the token from the single sign-on service.

17. The client device of claim 15, wherein the single sign-on service comprises a third-party single sign-on service.

18. The client device of claim 15, wherein the collaborative work environment comprises the single sign-on service.

19. The client device of claim 9, wherein the client application is configured to:

receive a user input to change a display property of the document content; and in response to receiving the user input, locally save the display property as a user preference.

20. The client device of claim 9, wherein the client application is configured to render the document content according to a locally saved user preference.

* * * * *